United States Patent Office 3,646,043
Patented Feb. 29, 1972

3,646,043
CERTAIN O,O-DIALKYL-S-[(1-PYRIDYL-2)-ALKYL-THIOETHYL]-PHOSPHOROTHIOATES AND THE CORRESPONDING PHOSPHORODITHIOATES
Tatsumi Nishimura, Shimizu, Hiroshi Shinohara, Ogasa-gun, Kiyoshi Takita, Shimizu, and Masaru Kado, Yokohama, Japan, assignors to Kumiai Chemical Industry Co., Ltd., Tokyo, Japan
No Drawing. Filed July 2, 1969, Ser. No. 838,701
Int. Cl. C07d 31/50
U.S. Cl. 260—294.8 K          7 Claims

ABSTRACT OF THE DISCLOSURE

Novel O,O-dialkyl-S-[1-(pyridyl)-alkylthioethyl]-phosphorothioates and -phosphorodithioates and insecticidal and miticidal compositions comprising the same as an active ingredient.

---

The present invention relates to novel phosphoric esters and more particularly novel insecticidal and miticidal compositions containing said phosphoric esters as an active ingredient.

The term "phosphoric acid esters" used herein means O,O-dialkyl-S - [1 - (pyridyl)-alkylthioethyl]-phosphorothioates and -phosphorodithioates having the following general formula:

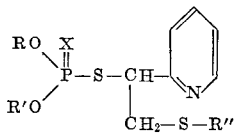

wherein R, R' and R'' represent lower alkyl groups respectively and X is an oxygen atom or a sulfur atom.

It is an object of the present invention to provide novel phosphoric esters and novel insecticidal and miticidal compositions containing the phosphoric esters as an active ingredient and an inert carrier.

The novel phosphoric esters according to the present invention are comparatively low in toxicity against warm blooded animals (30–100 mg./kg. mouse), and show a contact activity as well as a penetrating activity against various insects, particularly, aphis. Furthermore, the phosphoric esters are active to other insects such as green rice leaf hopper, smaller brown plant hopper and common cabbage worm (*Pieris rapae* Linne).

Moreover, the novel phosphoric esters according to the present invention have an excellent miticidal activity.

Dinitro compounds and organic phosphorus compounds have been heretofore used as controlling agents for mites, but when they are used continuously, a resistance to such agents is formed in mites. Therefore, it is necessary to use various series compounds by changing repeatedly successively, and also it is desirable to develop a novel miticide.

The phosphoric esters according to the present invention are active to mites having the resistance to the organic phosphorus compound such as Phenkapton [O,O-diethyl-S - (2,5 - dichlorophenylmethylmercaptomethyl)-dithiophosphate; trademark] and show an excellent controlling activity against harmful mites for agricultural products.

The phosphoric esters according to the present invention can be prepared by the following reaction formula:

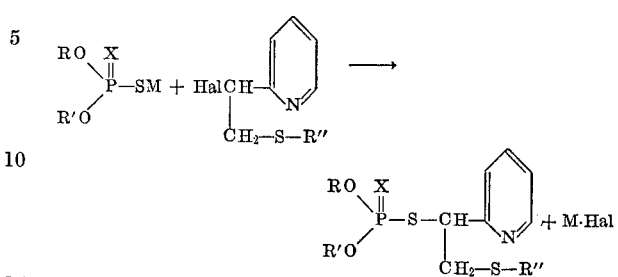

In the above formula, R, R' and R'' represent lower alkyl groups such as methyl, ethyl, propyl and butyl groups, X has the same meaning as described above, M represents an alkali atom or ammonium, and Hal represents a halogen atom.

Then, the present invention will be explained with respect to examples for synthesizing the compounds according to the present invention. (Moreover, compounds 1, 2 . . . described herein mean the compounds 1,2 . . . disclosed in Experimental Examples.)

PREPARATION EXAMPLE

Compound 1.—O,O-diethyl-S-[1-(pyridyl-2)-2-methylthioethyl]-phosphorodithioate

In a three-neck flask of 300 cc. was charged a solution of 22.4 g. (0.1 mole) of potassium O,O-diethyldithiophosphate in 200 cc. of acetone, and 18.8 g. (0.1 mole) of α-(1-chloro - 2 - methylthioethyl)-pyridine as produced as described hereinafter was added dropwise thereto, while stirring at room temperature, to produce white precipitates of potassium chloride. After the addition, stirring was continued while refluxing for 4 hours to complete the reaction.

The intermediate product, i.e., α-(1 - chloro-2-methylthioethyl)-pyridine was synthesized by an equimolar addition reaction of α-vinyl pyridine and methylsulfenyl chloride, and was identified with an infrared absorption band of the resulting product and a resonance structure of vinyl pyridine

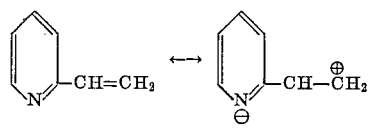

(described in J.A.C.S., 69, 2461 (1947) "Electrophilic reaction" of 2 and 4 vinyl pyridines).

After the reaction was completed, potassium chloride was filtered off at room temperature and the filtrate was concentrated under a reduced pressure and the residue was extracted with benzene, and then the extract was washed with water and was dried with anhydrous sodium sulfate. After drying, the benzene was distilled off and a further distillation was effected under a high vacuum to obtain 27 g. of a thermally decomposable brown transparent liquid which is not distilled off at 120° C./0.01 mm. Hg.

This liquid was confirmed to be the object product from the following results:

Refractive index: $n_D^{26} = 1.5740$
Elemental analysis:
Found value P: 9.18%
Calculated value P: 9.21%
IR absorption bands:
$CH_3$: 3,000 cm.$^{-1}$, etc.
$C_2H_5$: 2,930 cm.$^{-1}$, etc.
N: 1,590 cm.$^{-1}$, etc.
$(C_2H_5O)_2P$: 1,020 cm.$^{-1}$ ~970 cm.$^{-1}$ (two wide absorptions)
P=S: 660 cm.$^{-1}$, etc. (strong)
Yield: 80%

The other active ingredients obtained by the above described process are listed with the yield and the refractive index as follows:

Compound 2: O,O-diethyl-S-[1-(pyridyl-2) - 2 - methylthioethyl]-phosphorothioate
Yield: 58%, $n_D^{26} = 1.5382$
Compound 3: O,O-dimethyl-S-[1 - (pyridyl-2)-2-methylthioethyl]-phosphorothioate
Yield: 61.5%, $n_D^{25} = 1.5778$
Compound 4: O,O-dimethyl-S-[1 - (pyridyl-2)-2-methylthioethyl]-phosphorodithioate
Yield: 71.0%, $n_D^{25} = 1.6016$
Compound 5: O,O-diisopropyl-S-[1-(pyridyl-2)-2-methylthioethyl]-phosphorodithioate
Yield: 79.0%, $n_D^{26} = 1.5550$
Compound 6: O-methyl-O-isopropyl-S-[1 - (pyridyl-2)-2-methylthioethyl]-phosphorothioate
Yield: 70.7%, $n_D^{26} = 1.5462$ These compounds are yellow or brown transparent liquids and are poorly water-soluble but easily soluble in an organic solvent. When these compounds are used as insecticides and miticides, said compounds are mixed with an inert carrier (diluent) to prepare dusts, wettable powders and emulsifiable concentrates, which can be spread directly or used after diluted to a proper concentration.

The term "carrier" used herein means vehicles to be used for carrying the active component to a desired area, which may be both solid and liquid.

For example, as solid carrier use may be made of various clay, talc, kaolin, diatomaceous earth, calcium carbonate, white carbon and saw dust. As liquid carrier, use may be made of solvent for the active components and non-solvent which can disperse or dissolve the active component by means of an auxiliary agent, for example, water, benzene, kerosine, alcohols, acetones, methylnaphthalene, xylene.

The term "surfactant" used herein involves non-ionic surfactants, such as polyoxyethylenesorbitan monolaurate, etc., cationic surfactants, such as alkyldimethylbenzylammonium chloride, alkylpyridinium halide, etc., anionic surfactants, such as alkylbenzenesulphonate, higher fatty alcohol sulphate, etc., amphoteric surfactants, such as lauryl amine derivatives, betaine derivatives, dodecyldiaminoethyl glycine, etc.

The invention will be explained further with respect to some preparation examples, but the diluents, the mixture ratios and the active components can be varied in a wide range. The percent means by weight.

EXAMPLE 1

Dust

Two percent of O,O-diethyl-S-[1 - (pyridyl-2)-2-thioethyl]-phosphorodithiophosphate, 5% of diatomaceous earth, 50% of kaolin and 43% of talc were mixed and pulverized to form a dust, which is dusted.

EXAMPLE 2

Wettable powder

Twenty percent of O,O-diethyl-S-[1 - (pyridyl-2)-2-methylthioethyl]-phosphorothioate, 20% of diatomaceous earth, 55% of kaolin and 5% of a mixture of polyoxyethylene alkylphenyl ether, polyoxyethylene phenylphenol ether and polyoxyethylene carboxylate, which is a spreading agent, were mixed and pulverized to form a wettable powder, which is used as an emulsion in water.

EXAMPLE 3

Emulsifiable concentrate

Twenty percent of O,O-dimethyl-S-[1 - (pyridyl-2)-2-methylthioethyl]-phosphorothioate, 60% of xylene and 20% of a mixture of polyoxyethylene alkylphenyl ether, polyoxyethylene phenylphenol ether and polyoxyethylene carboxylate, which is an emulsifier, were mixed and dissolved to obtain an emulsifiable concentrate, which is used after diluted with water.

EXAMPLE 4

Dust

Two percent of O,O-dimethyl-S-[1-(pyridyl-2)-2-methylthioethyl]-phosphorodithioate, 5% of diatomaceous earth, 50% of kaolin and 43% of talc were mixed and pulverized to form a dust, which is dusted.

EXAMPLE 5

Wettable powder

Twenty percent of O,O-diisopropyl-S-[1-(pyridyl-2-)-2-methylthioethyl]phosphorodithioate, 20% of diatomaceous earth, 55% of kaolin and 5% of a mixture of polyoxyethylene alkylphenyl ether, polyoxyethylene phenylphenol ether, polyoxyethylene carboxylate, which is a spreading agent, were mixed and pulverized to form a wettable powder, which is used as a suspension in water.

EXAMPLE 6

Emulsifiable concentrate

Twenty percent of O-methyl-O-isopropyl-S-[1-(pyridyl-2)-2-methylthioethyl]phosphorothioate, 60% of xylene and 20% of a mixture of polyoxyethylene alkylphenyl ether, polyoxyethylene phenylphenol ether and polyoxyethylene carboxylate, which is an emulsifier, were mixed and dissolved to form an emulsifiable concentrate, which is used after diluted with water.

Then Experimental Examples for preventing insects and mites by means of the active compounds according to the present invention will be explained.

EXPERIMENTAL EXAMPLE 1

Activity for killing green rice leaf hopper, *Nephotettix cincticeps* Uhler

The emulsifiable concentrate as prepared in Example 3 was diluted with water to concentrations of 2, 10, 50 and 250 p.p.m. The diluted solution was sprayed on potted rice plants. After drying in the open air, the rice plants were cut at the root side. Twenty female adults of the green rice leaf hopper were then confined with the treated rice plants in a glass tube covered with a nylon net. The median lethal concentrations (LC–50's) shown in Table 1 are the results determined based on the mortality counts made of 24 hours after treatment.

TABLE 1

| Active ingredient: | LC–50 (p.p.m.) |
|---|---|
| Compound 1 | 10~50 |
| Compound 2 | 50~250 |
| Compound 3 | >250 |
| Compound 4 | >250 |
| Compound 5 | >250 |
| Compound 6 | 50~250 |

EXPERIMENTAL EXAMPLE 2

Acaricidal effectiveness on the citrus red mite,
*Panonychus citri* McGregor

Emulsifiable concentrate of test sample formulated as described in Example 3 was diluted 400 times to produce 0.05% solution, which was sprayed on seedlings of a summer orange infested with the citrus red mites by means of a spray gun in such a manner that both the sides of leaves were moistened sufficiently. After sprayed, the thus treated seedlings were kept in a green house and number of living mites was counted. The result is shown in Table 2.

TABLE 2

| Active ingredient | Number of mites before spraying | Number of living mites after spraying | | | |
|---|---|---|---|---|---|
| | | 2 days | 6 days | 14 days | 18 days |
| Compound: | | | | | |
| 1 | 40 | 0 | 0 | 1 | 3 |
| 2 | 43 | 0 | 0 | 2 | 8 |
| 3 | 32 | 1 | 0 | 3 | 11 |
| 4 | 38 | 0 | 2 | 7 | 13 |
| 5 | 31 | 1 | 2 | 5 | 9 |
| 6 | 45 | 0 | 0 | 2 | 6 |
| Control: | | | | | |
| Phenkapton emulsifiable concentrate | 40 | 0 | 2 | 8 | 30 |
| Danimin wettable powder | 35 | 4 | 5 | 27 | 28 |
| Non-treated | 26 | 21 | 22 | 46 | 50 |

Phenkapton was an emulsifiable concentrate containing 18% of O,O-diethyl - S - (2,5 - dichlorophenylmethyl-mercaptomethyl)dithiophosphate, which was used after diluted to 1,000 times.

In addition, Danimin was a wettable powder containing 25% of 4-chlorophenyl-2,4,5-trichlorophenyl azosulfide, 10% of bis(4-chlorophenyl) disulfide and 15% of bis(4-chlorophenoxy)methane, which was used after diluted to 1,000 times.

Experimental Example 3.—Test for toxicity against Cabbage aphid, *Brevicoryne brassical L.*

TABLE 3

| Active ingredient | Contact method LC-50 (p.p.m.) | Systemic method LC-50 (p.p.m.) |
|---|---|---|
| Compound | | |
| 1 | 10 | 50 |
| 2 | 50~250 | 50 |
| 4 | 250 | 250 |
| 5 | <10 | 50~250 |
| 6 | 50~250 | 10 |

What is claimed is:

1. A phosphoric ester of the general formula

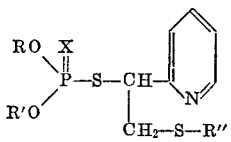

wherein R, R' and R" represent lower alkyl groups respectively and X represents oxygen atom or sulfur atom.

2. The phosphoric ester as claimed in claim 1, wherein said ester is O,O - diethyl-S-[1-(pyridyl-2)-2-methylthioethyl]-phosphorodithioate.

3. The phosphoric ester as claimed in claim 1, wherein said ester is O,O - diethyl-S-[1-(pyridyl-2)-2-methylthioethyl]-phosphorodithioate.

4. The phosphoric ester as claimed in claim 1, wherein said ester is O,O - dimethyl-S-[1 - (pyridyl-2) - 2 - methylethyl]-phosphorodithioate.

5. The phosphoric ester as claimed in claim 1, wherein said ester is O,O - dimethyl-S-[1 - (pyridyl-2) - 2 - methylethyl]-phosphorodithioate.

6. The phosphoric ester as claimed in claim 1, wherein said ester is O,O - diisopropyl-S-[1-(pyridyl-2)-2-methylethyl]-phosphorodithioate.

7. The phosphoric ester as claimed in claim 1, wherein said ester is O-methyl - O - isopropyl-S-[1-(pyridyl-2)-2-methylthioethyl]-phosphorothioate.

References Cited

UNITED STATES PATENTS 3,304,226  2/1967  Epstein et al. _____ 167—33
2,961,445  11/1960  Saul _____ 260—294.8 K

OTHER REFERENCES

Ross et al., J. Am. Chem. Soc., vol. 69, pp. 2468–69, October 1947, QD1A5.

ALAN L. ROTMAN, Primary Examiner

U.S. Cl. X.R.

260—297 P, 424—263